V. F. DAVIS.
TEMPERATURE REGULATOR.
APPLICATION FILED SEPT. 23, 1915.
1,193,671.
Patented Aug. 8, 1916.
2 SHEETS—SHEET 1.
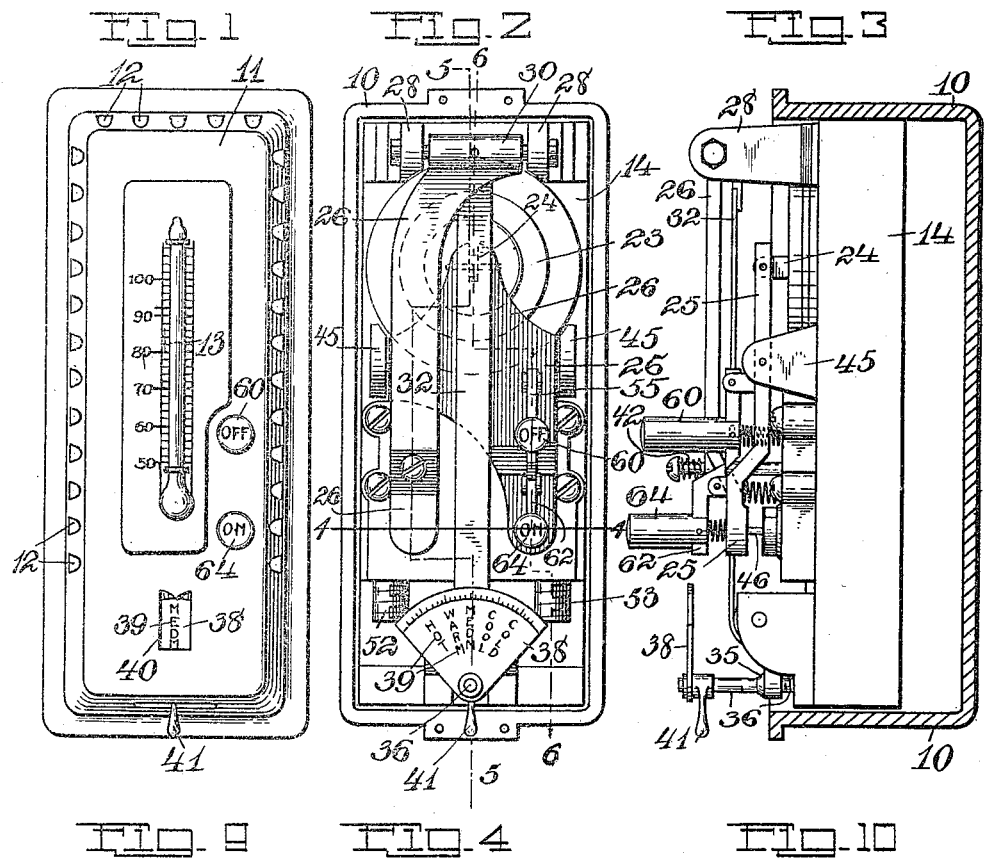
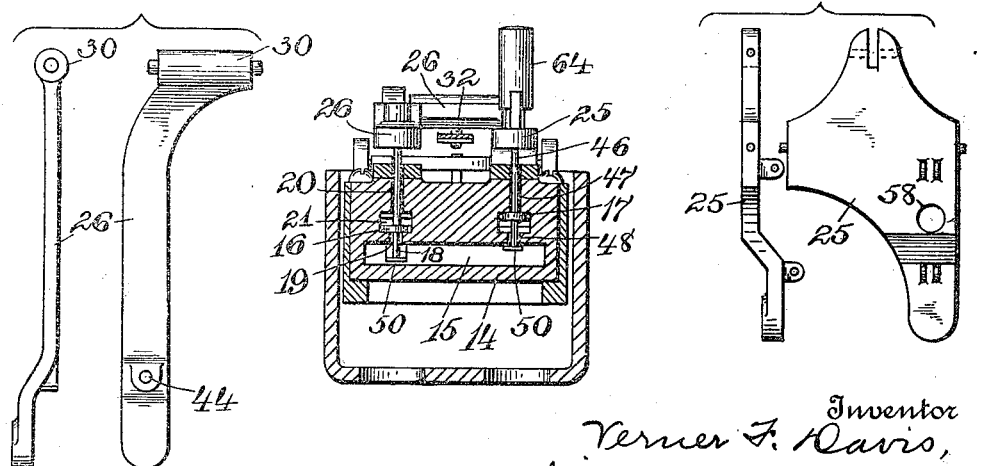
Inventor
Verner F. Davis,
By his Attorneys
Dyke + Caulfield

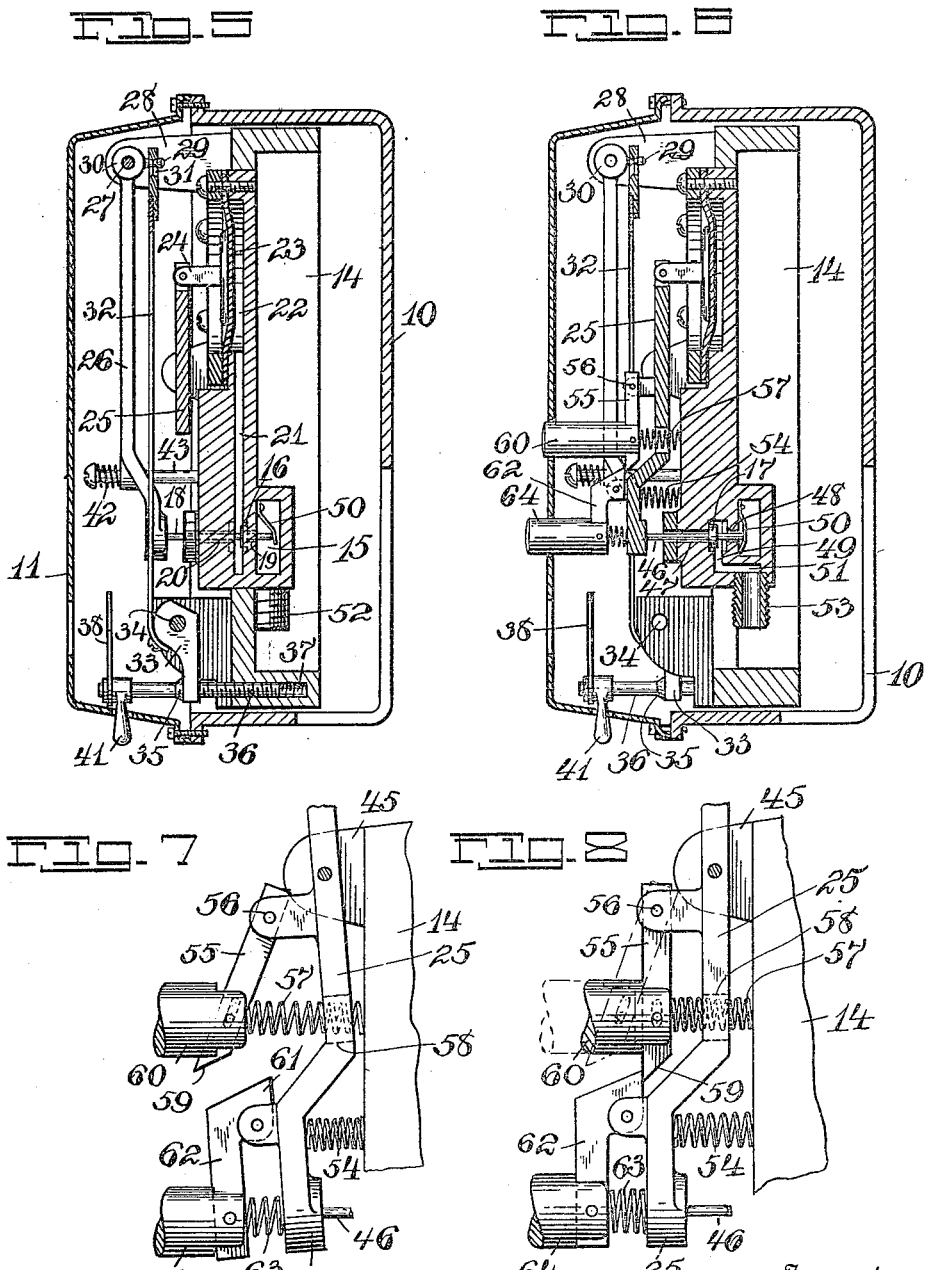

UNITED STATES PATENT OFFICE.

VERNER F. DAVIS, OF ORANGE, NEW JERSEY.

TEMPERATURE-REGULATOR.

1,193,671.   Specification of Letters Patent.   Patented Aug. 8, 1916.

Application filed September 23, 1915. Serial No. 52,150.

*To all whom it may concern:*

Be it known that I, VERNER F. DAVIS, a citizen of the United States, and a resident of Orange, county of Essex, and State of New Jersey, have invented certain new and useful Improvements in Temperature-Regulators, of which the following is a specification.

This invention relates to an improved regulator which is usually used in conjunction with a fluid-pressure motor for controlling a heating unit, such use, for instance, being such as would be required in controlling the valve of a radiator.

While the invention is adapted for many different situations and requirements, its use and operation in connection with a radiator will be set forth in this specification to fully describe and make plain its construction and operation.

The regulator is operated in one direction by a yielding means such as a spring, and in the other direction by an element that changes its dimension according to temperature, the regulator acting either to admit a fluid under pressure to a fluid motor such as a diaphragm valve, or to shut off such fluid and permit the escape of such fluid as is in the fluid pressure motor.

The use of these regulators in such systems is well known to those skilled in the art, the invention in this case residing in a regulator which has an adjusting means for regulating the point or temperature at which the valve is to operate, such adjusting means being simple and easily operated.

The valve is further designed to operate under various pressures of fluid used in operating the motor, so that under a lower pressure certain valves in a system of valves will operate, but under a higher pressure all the valves in the system will operate. This permits the regulated heating of some rooms in a building while other rooms are not heated, thus economizing in fuel. The valve is provided with an accessible and easily operated manual latch for changing the valve from one operable by a low pressure of fluid to one operated by a higher pressure and vice versa.

The invention is illustrated in the accompanying drawings, in which—

Figure 1 is a face view of my improved regulator, and Fig. 2 is a similar view with the cover removed. Fig. 3 is a side view of the regulator shown in Fig. 2 with the rear of its casing shown in section. Fig. 4 is a horizontal section on line 4—4 in Fig. 2. Fig. 5 is a vertical section taken on line 5—5 in Fig. 2, but showing the thermostatic strip in elevation. Fig. 6 is a section on line 6—6 in Fig. 2. Fig. 7 is a detail view of one form of latch for varying the pressure at which the regulator will operate, this view showing the parts unlatched. Fig. 8 is a similar view but showing the parts latched. Fig. 9 shows a side and front of the lever of the primary valve, and Fig. 10 shows a side and front of the lever of the secondary valve.

The regulators can be of many different forms and designs, but as they are usually placed on the walls of rooms, a backing 10 is used as a casing, the backing being fastened to the wall and having a suitable cover 11 thereon, which cover is usually perforated as at 12 so that the temperature in the casing is the same as the room temperature. The cover can also be provided with a thermometer 13.

The regulator is usually secured in a vertical position, its body portion 14 being suitably fastened in the casing and having a chamber 15 therein, which chamber has an inlet pipe opening 52 which is connected to a source of fluid under pressure, usually compressed air. The chamber 15 has two valves controlling the passage of air under pressure from said chamber. These valves are the primary valve 16 and the secondary valve 17. The primary valve has a stem 18 which passes loosely through the parts 19 and 20 and has its valve part arranged in the passage 21 and adapted to close either of these parts, according to the movement of the valve. The passage 21 extends upward to the diaphragm chamber 22, in which is a diaphragm 23 which is connected by a stem 24 to the secondary lever 25. The outer end of the stem 18 of the primary valve rests against the end of the primary lever 26, which is pivoted at 27 to the lugs 28 of the body portion 14. The stud 29 of the boss 30 of the lever 26 engages the upper end of the slot 31 of the thermostatic strip 32, which is suitably fastened at the bottom. One form of fastening is shown in the drawing, this form being adjustable and consisting of an arm 33 which is adapted to rock on a pin 34 and has the end of the thermostatic strip 32 fastened to it. The arm 33 is engaged by a collar 35 of a screw 36, the screw being in engagement with the screw-threaded opening 37 in the body portion. The rod or screw 36 has a dial 38 thereon which has suitable markings or legends 39 which are successively placed in rear of an opening 40 in the cover to indicate the relative adjustments of the thermostatic strip. A handle 41 provides the turning of the rod 36. The lever 26 and the thermostatic strip 32 are kept in position by a spring 42 which bears against the head of the post 43 which passes through the hole 44 in the lever.

The secondary valve lever 25 is pivoted as to the lugs 45 and bears at its lower end against the stem 46 of the secondary valve 17, the stem passing loosely through the ports 47 and 48 and sliding in the chamber 49 to alternately close the ports 47 and 48. Both valves 16 and 17 are pressed by light springs 50 which exert just enough force to hold the stems of their valves against the valve operating levers.

The chamber 49 is connected by a duct 51 to the pipe connection 53 which is connected by suitable piping to a fluid pressure motor such as a diaphragm or similar valve. The secondary valve lever 25 is yieldingly pressed outward by a spring 54 to collapse the diaphragm 23 when the pressure behind the diaphragm is removed.

The secondary lever 25 has mounted thereon a latch 55 which is pivoted as at 56 and is pressed outward by a spring 57 which passes freely through the hole 58 in the lever 25. The latch 55 has its lower end 59 beveled so that when the button 60 is pushed, the end 59 catches over the nose 61 of the finger 62 and is locked thereto as the spring 63 holds the finger in place. When so latched, the spring 57 adds its influence to that of the spring 54 to hold the lever 25 against the action of the diaphragm 23. The latch 55 is released by pressing the button 64 to permit the nose 61 to swing out of the path of the end 59 of the latch.

The operation of the device is as follows: Assuming that the latch 55 is in the position shown in Figs. 3, 6 and 8, that is, latched, and that the chamber 15 is supplied through the pipe connection 52 with compressed air, at say twenty pounds pressure, if the temperature of the room rises above a predetermined point, the thermostatic strip 32 expands and permits the primary lever 26 to be pushed by the spring 42, and its end pushes the stem 18 of the valve 16 so as to shut the port 19 and open the port 20. This allows air in the diaphragm chamber and the passage 21 to be vented through the port 20. The springs 54 and 57 push the lever 25 to compress the diaphragm and also to allow the valve stem 46 and the valve 17 to be moved by its spring 50. This closes the port 47 and opens port 48, allowing compressed air to pass from 15 to 51 and thus through pipe openings 53 to pipe connections to the radiator valve, and the valve through its fluid pressure motor is forced shut and the heat is shut off. When the air cools and the thermostatic strip shortens, the lever 26 is pulled out against the spring 42, the valve stem 18 is allowed to be pushed out by its spring 50, and compressed air from the chamber 15 passes through port 19 to the passage 21 and thus to the diaphragm chamber 22. The diaphragm 23 and the upper end of the secondary valve lever 25 are thus forced outward and the lower end of the lever inward to move the valve 17 to close port 48 and open port 47 to vent the fluid pressure motor and thus allow it to move to open the radiator valve. The adjustment of the strip 32 governs the point of operation of the primary valve and the adjustment is made by simply turning the handle 41 to either lengthen or shorten the strip 32.

When the regulator is to operate at a lower pressure, the latch 55 is released and this also releases the spring 57 so that the spring 54 alone presses the secondary lever 25 against the influence of the diaphragm. The utility of this latch is in the possibility of economy of fuel and in the positive operation of the latch. For instance, in a hotel, school or similar structure, the pressure of the compressed air is lowered at night, to say fifteen pounds, and the buttons 60 in those rooms that are not to be heated are pressed, then the diaphragms of the regulators in those rooms will not be operated against the combined pressures of springs 54 and 57. In guests' rooms who desire no heat, or in vacant rooms, this result can be accomplished, but those rooms with unlatched regulators still have their heat regulated by the diaphragms operating at fifteen pounds, since only the springs 54 in these regulators are active. This, for instance, in rooms used in night school and in constantly frequented parts of a building. In the morning when the engineer, janitor or other employee of the building turns on the increased or day pressure of compressed air, say twenty pounds, this pressure operates all regulators whether latched or unlatched, as the increased pressure overcomes the resistance of the additional spring 57 applied to secondary levers when the latches are latched.

It will be evident that many changes in details, arrangements and proportions of parts, and operation of the several devices, can be made without departing from the scope of the invention as set forth in the appended claims.

Having thus described my invention, I claim:

1. A regulator comprising a structure having a valved passage for conducting fluid under pressure, thermostatic means for controlling the passage of air under pressure through the passage, means operated in one direction by air when admitted to the passage, yielding means, as a spring, for opposing the air-operated means, and a spring latch adapted to be placed in and out of operative contact with the air-operated means so as to assist the spring when in operative contact.

2. A regulator comprising a lever, a diaphragm for operating the lever in one direction, thermostatic means for controlling the operation of the diaphragm, a spring opposing the diaphragm, an additional spring having no influence on the lever when released, and means on the lever for engaging the spring to make it operative on said lever so as to assist the first spring.

3. A regulator comprising a lever, a diaphragm for operating the lever in one direction, thermostatic means for controlling the operation of the diaphragm, a spring opposing the diaphragm, an additional spring having no influence on the lever when released, a latch on the lever and bearing on the additional spring, and a holding and releasing means for the latch so that when the latch is held, the additional spring assists the first spring in opposing the action of the diaphragm.

4. A regulator comprising a lever, a diaphragm operating the lever, thermostatic means for controlling the operation of the diaphragm, a spring for operating the lever against the pressure from the diaphragm, an additional spring adjacent the lever, a latch swinging on the lever and in engagement with the additional spring, a button on the latch, and a holding and releasing means for the latch.

5. A regulator comprising a lever, a diaphragm operating the lever, thermostatic means for controlling the operation of the diaphragm, a spring for operating the lever against the pressure from the diaphragm, an additional spring adjacent the lever, a latch swinging on the lever and in engagement with the additional spring, a button on the latch, a swinging finger having a nose thereon for engaging the latch, and a spring for swinging the arm to its locking position.

6. A regulator comprising a body portion, a swinging arm with a curved face to which a thermostatic strip is adapted to be attached, a screw passing through the arm and into the body portion beyond said arm, a collar on the screw to engage the arm, the collar acting on the arm in opposition to the tension of the strip, a handle on the screw, and an indicator on the screw, the handle and the indicator being on the outer edge of the screw, the arm being placed between the handle and the body portion, the arm engaging the screw between the handle and the body portion.

In testimony that I claim the foregoing, I have hereto set my hand, this 31st day of August, 1915.

VERNER F. DAVIS.

Copies of this patent may be obtained for five cents each, by addressing the "Commissioner of Patents, Washington, D. C."